(12) United States Patent
Ellis et al.

(10) Patent No.: US 7,309,211 B2
(45) Date of Patent: Dec. 18, 2007

(54) BALANCING METHOD

(75) Inventors: Stuart Ellis, Ripley (GB); Michael P Keenan, Sheffield (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/282,595

(22) Filed: Nov. 21, 2005

(65) Prior Publication Data
US 2006/0133938 A1    Jun. 22, 2006

(30) Foreign Application Priority Data
Dec. 18, 2004    (GB) ................... 0427789.3

(51) Int. Cl.
*F03B 3/12*    (2006.01)
(52) U.S. Cl. ...................... 416/144; 416/500
(58) Field of Classification Search ................. 416/144, 416/145, 231 R, 500
See application file for complete search history.

(56) References Cited

U.S. PATENT DOCUMENTS 6,893,222 B2 * 5/2005 Allam ........................ 416/144

2004/0115077 A1 * 6/2004 Iwanari ..................... 417/423.3

FOREIGN PATENT DOCUMENTS

| EP | 1 380 759 A | 1/2004 |
|---|---|---|
| JP | 9121516 AB | 5/1997 |

* cited by examiner

*Primary Examiner*—Edward K. Look
*Assistant Examiner*—Dwayne J White
(74) *Attorney, Agent, or Firm*—W. Warren Taltavull; Manelli Denison & Selter PLLC

(57) ABSTRACT

A method of balancing a rotor, where the rotor comprises a plurality of holes, comprises the steps of measuring an imbalance of the rotor, identifying at least one characteristic dimension associated with at least one hole, identifying a change to the or each characteristic dimension to reduce the imbalance, and changing the or each characteristic dimension.

4 Claims, 2 Drawing Sheets

BALANCING METHOD

FIELD OF THE INVENTION

This invention relates to the balancing of rotating components. More specifically, although not exclusively, it relates to the balancing of rotor discs or drums for gas turbine engines.

BACKGROUND OF THE INVENTION

The main rotating assemblies of gas turbine engines comprise compressors and turbines, rotating on shafts. As with any rotating assembly, any imbalance in these assemblies will give rise to vibration and stresses. The magnitude of these stresses increases as the square of the rotational speed.

Rotational speeds in gas turbine engines vary with the type of engine and the conditions of operation, but speeds of several thousand revolutions per minute are common. Because of these high rotational speeds, even slight unbalance in the main rotating assemblies can quickly give rise to damaging stresses, and so very accurate balancing of the assemblies is essential.

Two common ways of balancing a rotor disc or drum of a gas turbine engine are i) by providing additional material (a "balance land") on the rotor drum. This is then selectively machined away during manufacture to achieve the desired balance adjustment. The balance land is essentially parasitic mass. It cannot be assumed to carry any loads, as there is no guarantee it will be there in the final part. Conversely, for stress purposes it must be assumed that all the mass is present, in case none of it has to be machined away. The balance land is therefore an undesirable feature;

ii) by adding additional mass selectively to a component or assembly, in the form of, for example, screwed or riveted plugs, heavy wire, balancing plates or nuts. This method also adds parasitic mass to the component, and has the further disadvantage that the balancing masses may become detached from the component and cause damage elsewhere in the engine.

Conventionally, rotor discs and drums are connected to neighbouring components by means of bolted flanges. As well as the bolt holes, such rotors typically have stress defender holes, which help to reduce the increased stresses found at stress concentration features around the bolt holes.

SUMMARY OF THE INVENTION

This invention provides a means of balancing a rotor without adding parasitic mass to it, by adjusting the dimensions or positions of holes in the rotor. Typically these will be bolt holes or stress defender holes.

According to one aspect of the present invention, a method of balancing a rotor having a plurality of holes comprises the steps of measuring an imbalance of the rotor, identifying at least one characteristic dimension associated with at least one hole, identifying a change to the or each characteristic dimension to reduce the imbalance, and changing the or each characteristic dimension.

The characteristic dimension may be hole diameter, hole radial position, hole circumferential position, counterbore diameter or counterbore depth.

The hole may be a stress defender hole, or may be a bolt hole.

According to another aspect of the present invention, a rotor is provided, balanced according to the method described in any of the three preceding paragraphs.

The rotor may be part of a compressor for a gas turbine engine.

The rotor may be part of a gas turbine engine.

According to another aspect of the present invention, a rotor for a gas turbine engine has a plurality of bolt holes spaced around its circumference and a plurality of stress defender holes interposed between the bolt holes, and the rotor is balanced by a method comprising the steps of measuring an imbalance of the rotor, identifying a change to the diameter of at least one stress defender hole to reduce the imbalance, and changing the or each diameter.

BRIEF DESCRIPTION OF THE DRAWINGS

The invention will now be described more fully, by way of example, with reference to the following drawings in which.

DETAILED DESCRIPTION OF THE INVENTION

Figure 1:
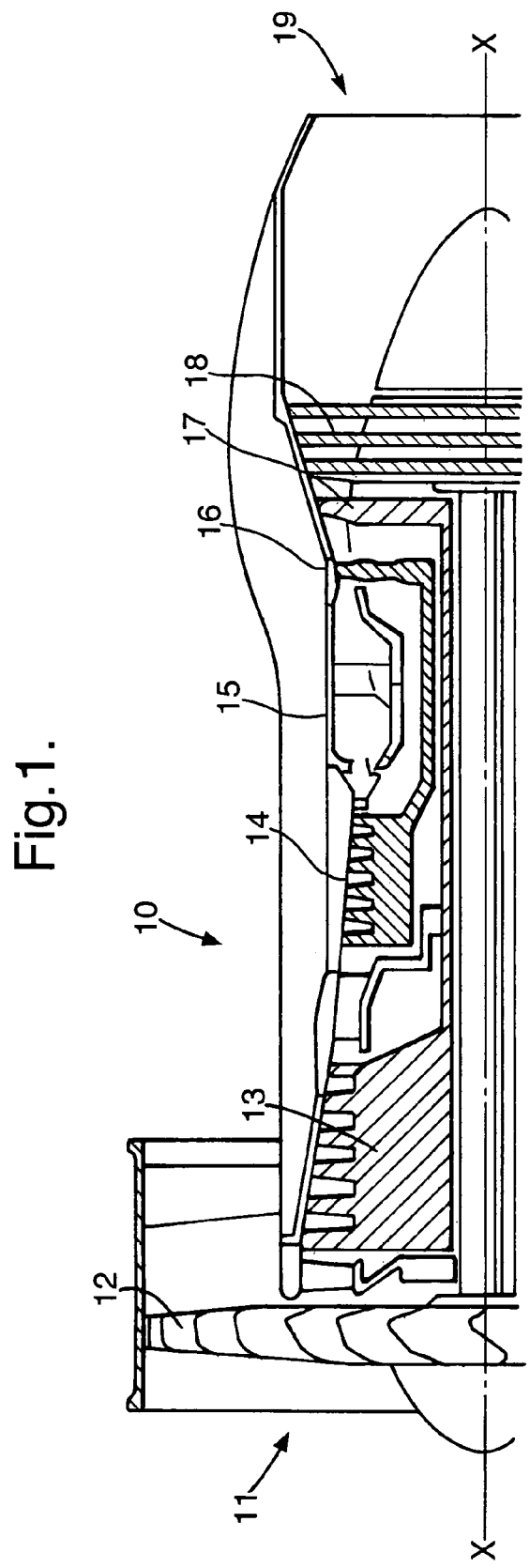
FIG. 1 is a sectional side view of the upper half of a gas turbine engine of known type.

Referring first to FIG. 1, a gas turbine engine 10 comprises, in axial flow series, an air intake 11, a propulsive fan 12, an intermediate compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in known manner so that air entering the intake 11 is first accelerated and compressed by the fan 12. It is subsequently split into two airflows—a first airflow into the intermediate pressure compressor 13 and a second airflow which provides propulsive thrust. The intermediate pressure compressor 13 compresses the air directed into it before delivering it to the high pressure compressor 14 where further compression takes place.

The compressed air delivered from the high pressure compressor 14 is directed into the combustor 15, where it is mixed with fuel and the mixture combusted. The resultant hot combustion products then expand through the high, intermediate and low pressure turbines 16, 17 and 18, thereby driving them, before being exhausted through the nozzle 19 to provide additional propulsive thrust. The high, intermediate and low pressure turbines 16, 17 and 18 respectively drive the high and intermediate compressors 14 and 13 and the fan 12 by suitable connecting shafts.

Figure 2:
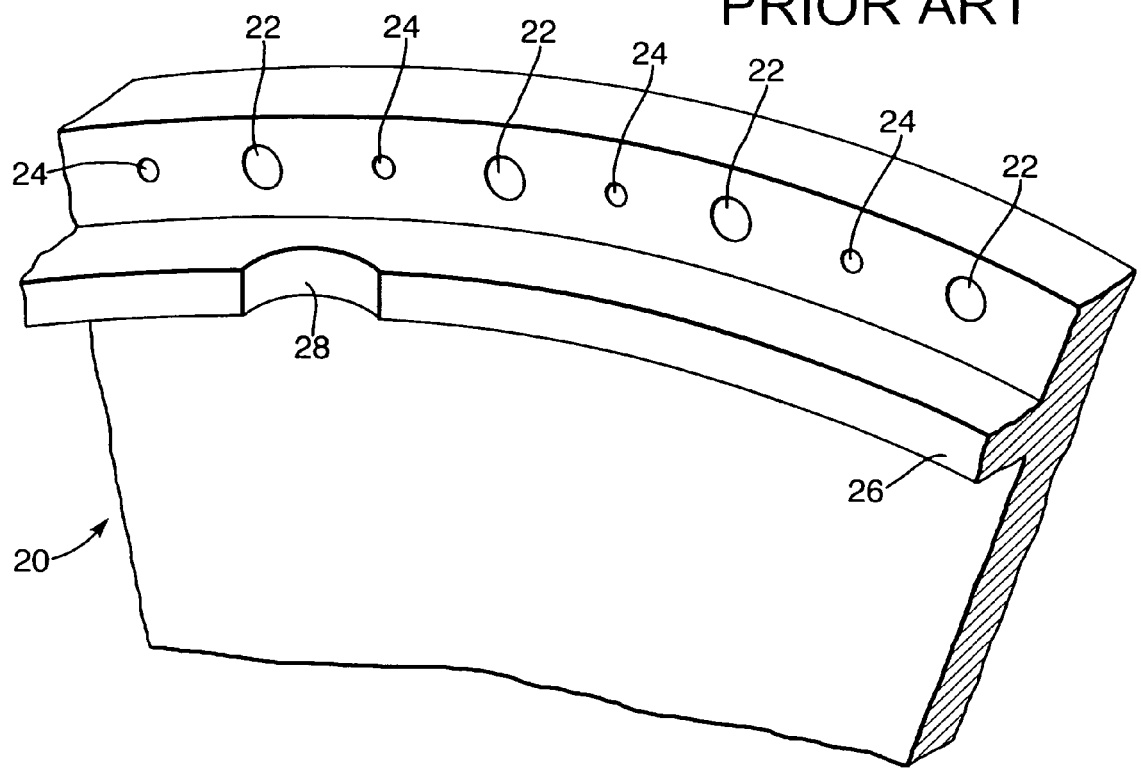
FIG. 2 shows part of a bolted flange of a compressor rotor drum balanced in known manner.

The fan, compressors and turbines of the engine 10 each comprise one or more arrays of blades. The blades in each array are mounted so that they extend radially outwardly from a rotor. The rotors are mounted so that they can rotate about an axis X-X. It is common for several rotors in a given compressor or turbine to be connected together, for example by welding or by bolted flanges, to form a unit FIG. 2 shows part of a rotor of known type. The rotor 20 has a plurality of bolt holes 22 spaced around its circumference. Bolts pass through these holes to secure the rotor to an axially adjacent rotor (not shown). Interposed between the bolt holes 22 are stress defender holes 24. These help to reduce the increased stresses found at stress concentration features around the bolt holes.

The rotor is also provided with a balance land 26. When the rotor is balanced, material is selectively machined away from the land 26, as shown at 28, to reduce the imbalance in the rotor.

Figure 3:
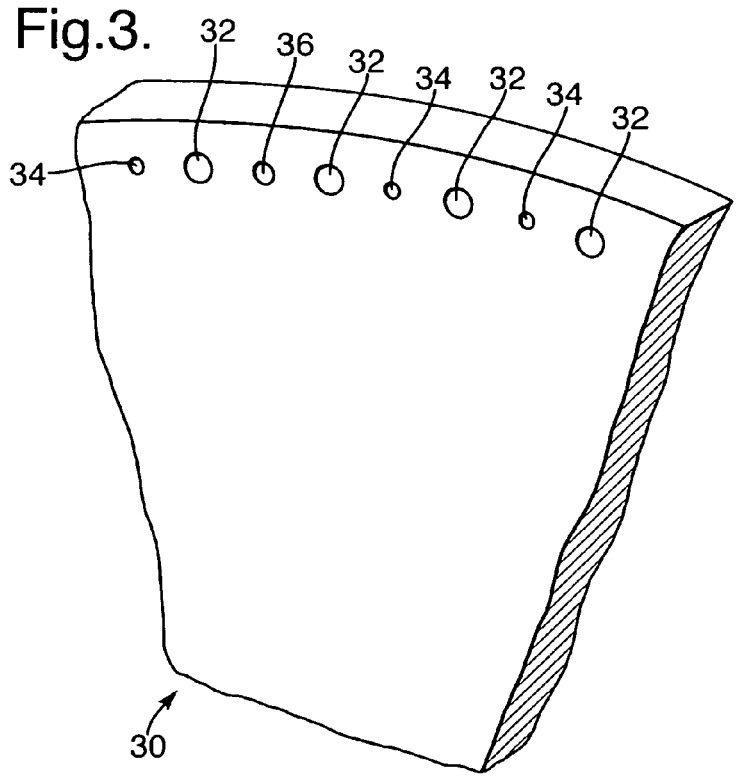
FIG. 3 shows part of a bolted flange of a compressor rotor balanced according to the invention.

FIG. 3 shows a part of a rotor balanced according to the invention. The rotor 30 has a plurality of bolt holes 32 spaced around its circumference, and interposed between these are stress defender holes 34. One stress defender hole 36 has been made larger than the others; this alters the mass distribution of the rotor and thereby adjusts its balance. In this way the balance of the rotor can be adjusted without the need for the large parasitic mass of the balance land of FIG. 2.

It will be appreciated that the same effect of altering the mass distribution of the rotor could be achieved by means other than increasing the diameter of the stress defender holes. For example, their radial or circumferential position could be altered, or a counterbore of the required size could be added to a stress defender hole.

Alternatively or additionally, similar changes could be made to the positions or dimensions of one or more bolt holes.

Alternatively or additionally, extra holes (being neither bolt holes nor stress defender holes) could be provided in a rotor, specifically for balancing purposes, and the changes made to their positions or dimensions.

Furthermore, it will be appreciated that although the invention has been described in the context of a gas turbine engine, the principles set out in this specification could equally well be applied to any sort of rotor whose balance is to be corrected.

There is thus provided a method of balancing a rotor that avoids the difficulties inherent in the prior art, and allows the construction of rotors whose dimensions and weights are optimised.

We claim:

1. A compressor for a gas turbine engine having a rotor, the rotor having a plurality of holes, the rotor being balanced by measuring an imbalance of the rotor, identifying at least one characteristic dimension associated with at least one hole, identifying a change to the at least one characteristic dimension to reduce the imbalance, and making the identified change to the at least one characteristic dimension.

2. A compressor for a gas turbine engine having a rotor as claimed in claim 1, in which the at least one characteristic dimension is selected from the group consisting of hole diameter, hole radial position, hole circumferential position, counterbore diameter and counterbore depth.

3. A compressor for a gas turbine engine having a rotor as claimed in claim 1, in which the at least one hole is selected from the group consisting of bolt holes and stress defender holes.

4. A rotor for a gas turbine engine, the rotor having a plurality of bolt holes spaced around its circumference and a plurality of stress defender holes interposed between the bolt holes, the rotor being balanced by a measuring an imbalance of the rotor, identifying at least one characteristic dimension associated with at least one hole, identifying a change to the at least one characteristic dimension to reduce the imbalance, and making the identified change to the at least one characteristic dimension.

* * * * *